United States Patent [19]

Garner et al.

[11] Patent Number: 4,514,596
[45] Date of Patent: Apr. 30, 1985

[54] TELEPHONE HANDSETS

[75] Inventors: Geoffrey M. Garner; Anthony J. Salloway, both of Northampton, England

[73] Assignee: Plessey Overseas Limited, Ilford, England

[21] Appl. No.: 384,184

[22] Filed: Jun. 1, 1982

Related U.S. Application Data

[63] Continuation-in-part of Ser. No. 169,792, Jul. 17, 1980, abandoned.

[51] Int. Cl.³ .............................................. H04M 1/00
[52] U.S. Cl. .................................................. 179/84 T
[58] Field of Search ................... 179/84 R, 84 T, 84 L

[56] References Cited

U.S. PATENT DOCUMENTS 4,156,800  5/1979  Sear et al. ......................... 179/110

FOREIGN PATENT DOCUMENTS 982714  1/1976  Canada ............................... 179/84 T Primary Examiner—Joseph A. Popek
Attorney, Agent, or Firm—Fleit, Jacobson, Cohn & Price

[57] ABSTRACT

A telephone subscriber subset including a transducer for generating audible signalling tone information in which the signalling tones are received at the input terminal as substantially sinusoidal electrical waveforms and including a converter within the handset for conversion of the signalling tones to a substantially non-sinusoidal electrical waveforms before feeding to the transducer.

3 Claims, 5 Drawing Figures

TELEPHONE HANDSETS

CROSS-REFERENCE TO RELATED PATENT APPLICATION

This invention is a continuation-in-part of U.S. Patent Application Ser. No. 169.792, filed July 17, 1980, now abandoned.

BACKGROUND OF THE INVENTION

The present invention relates to telephone handsets and more particularly to the provision of a low frequency tone for signalling purposes from a handset.

With the increasing demands for more sophisticated facilities in telephone sets and the availability of cheap low power electronics to meet this need, many telephone administrations are considering the introduction of "on-hook" dialling facilities where the progress of calls is monitored through a separate small sound reproducer mounted in the telephone set. The handset remains on the cradle until the required connection is made.

The realisation of these facilities requires the reproduction and transmission into air at adequate levels say 75 dB spl at one meter—of a range of frequencies which can be typically as low as 50 Hz (U.K. Public Switched Network dialling tone) and which must also include a substantial part of the telecommunication speech band for the speech monitoring. Because of the restrictions on transducer size and available electrical drive parameters it is difficult to obtain adequate sound pressure levels at the low frequencies required for adequate tone monitoring (50 Hz, 400 Hz etc.) from currently available small transducers. This invention describes a means of overcoming this problem.

SUMMARY OF THE INVENTION

The present invention provides a telephone subscriber subset including a transducer for generating audible signalling tone information in which the signalling tones are received at the input terminal as substantially sinusoidal electrical waveforms and including conversion means within the handset for conversion of the signalling tones to a substantially non-sinusoidal electrical waveforms before feeding to the transducer.

In a preferred embodiment the substantially non sinusoidal waveform is a square wave.

The invention may also comprise a detector circuit connected in series with the input terminals of the subscribers handset to detect the presence of speech and to inhibit operation of the conversion means thus allowing the speech to be fed directly to the transducer.

BRIEF DESCRIPTION OF THE DRAWINGS

Embodiments of the present invention will now be described, by way of example with reference to the accompanying drawings in which.

DESCRIPTION OF PREFERRED EMBODIMENT

It is well known that if a fundamental frequency and its harmonically related tones are reproduced by a transducer the ear can detect little difference between this and a harmonic series in which the harmonics are present but the fundamental is absent—i.e. the ear "supplies" the missing fundamental. This provides a means of producing the physiological effect to the listener of a particular frequency without it actually being propagated by the transducer. Consequently, a transducer which does not efficiently propagate low frequencies into free space maybe made to appear to do so by utilisation of a waveform conversion technique coupled with the natural properties of the ear.

The signalling tones received at the telephone set are usually composed of sinusoidal waveforms and do not contain a significant harmonic content. In this invention a high harmonic content to the transducer is ensured by converting incoming signalling tones to a substantially non-sinusoidal waveform in harmonics. By Fourier Analysis a square wave may be shown to both the fundamental and the odd harmonic frequencies, and similarly other complex periodic waveforms are comprised of harmonic series too. The overall effect of this wave conversion is that a transducer which does not propagate low frequencies well is made to appear to do so and there is an apparent low frequency sound enhancement. The conversion means may comprise any suitable device for detection of an incoming signal level and for activation of a square wave generator to produce a desired periodic square wave.

It is a particular feature of this invention to overcome the difficulty that the signalling tones and speech signal appear across the same two terminals at the telephone set. It is clearly undesirable to wave shape incoming speech—which is mainly higher frequency and which does not require level enhancement—in the same way as the low frequency tones. The invention provides in the telephone set a means of detecting the presence or absence of speech, for example, by identifying a frequency which is present in speech but is at a low level or absent in the incoming signalling tones. When speech is present the wave-shaper is disabled, when speech is absent it is enabled. As speech and tones are not present simultaneously the system will thus provide the required tone enhancement without detriment to the speech quality.

This invention may be used with any transducer, but it has a particular application to transducers utilising the piezoelectric effect which although simple and robust do not normally transmit low frequencies into free air at an adequate level for monitoring purposes.

Figure 1:
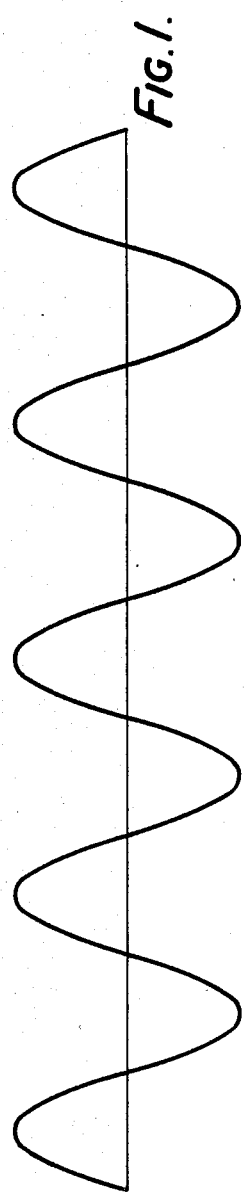
FIG. 1 shows a sinusoidal signalling waveform.
Figure 2:
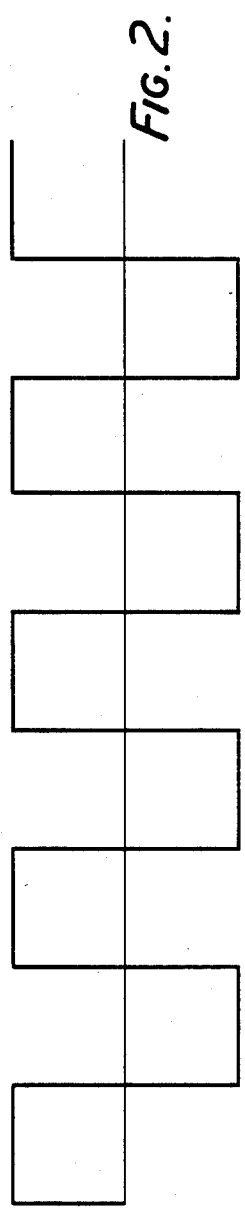
FIG. 2 shows the square waveform generated in the circuit of FIG. 4.
Figure 3:
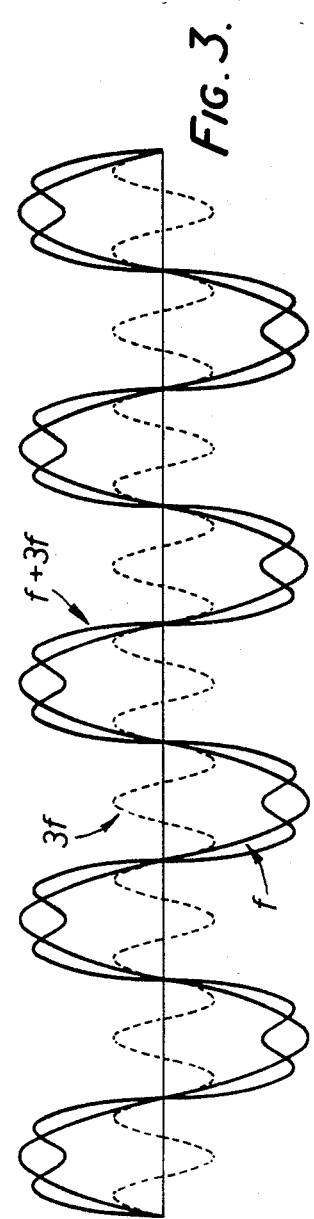
FIG. 3 shows the harmonically related sinusoidal frequencies within the waveform of FIG. 2

In a preferred embodiment the incoming, largely sinusoidal signalling waveform is as shown in FIG. 1, this is transposed by conventional electronic techniques to the square waveform shown in FIG. 2 which is fed to the transducer. Frequency analysis of the square waveform shown in FIG. 2 using the formula $$f(\alpha) = \frac{a_o}{2} + \sum_{t=1}^{\infty} (a_t \cos\tau\chi + b_t \sin\tau\chi)$$

shows that the tone generating waveform now consists of a series of harmonically related sinusoidal frequencies as shown in FIG. 3. For example, a 50 Hz square wave is composed of the sinusoidal waveform series 50, 150, 250, 350 Hz . . . etc. The transducer fed with such a frequency series need not be particularly sensitive to the lowest members of the series provided a sufficient number of the higher members of the series are reproduced at an appreciable sound level.

If this is so the physiological capability of the ear is such that the overall effect on the listener is that of hearing the fundamental frequency at a highly significant sound level even though it is being reproduced at a relatively low level by the transducer.

Figure 4:
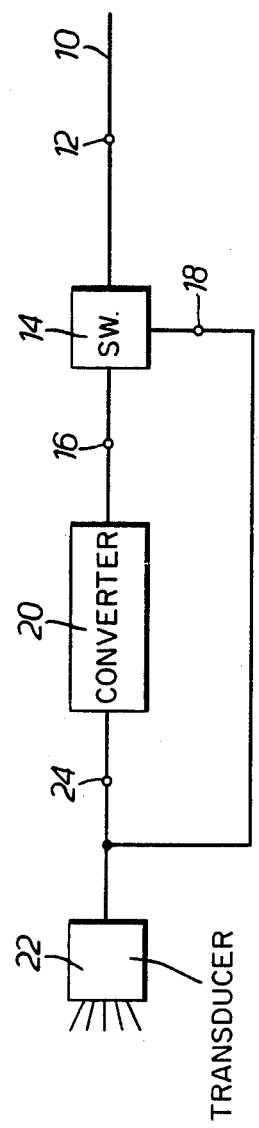
FIG. 4 shows a simplified block circuit diagram according to a preferred embodiment of the present invention and FIG. 5 shows an example of a frequency detector and switching circuit which maybe used in the invention.

Referring now to FIG. 4 the telephone line 10 is connected to the subscribers handset at a terminal 12. A single wire connection is shown for simplicity but in practice the connection would be normally two wire. Within the handset a speech/tone signal switch 14 is connected to the terminal 12 and the two outputs 16, 18 of the switch are connected respectively to a sinusoidal to square wave converter 20 and to a piezoelectric transducer 22. The output 24 of the converter 20 is connected also to the input of the transducer 22.

When a signal is received on line 10 the detector 14 decides whether it is a speech signal or a signalling signal on the basis of the frequency content or the signal level at a given frequency of the signal. It is is a speech signal it is routed via output 18 directly to transducer 22 but if it is a signalling system it is routed to converter 20 for conversion to a square wave or similar signal prior to being fed to transducer 22.

Thus speech signals are reproduced without modification whilst low frequency signalling signals are modified to produce the necessary harmonic frequencies for the generation of the desired output sound.

The transducer may be of the type described in our British Pat. No. 1,515,287. (U.S. Pat. No. 4,156,800).

Figure 5:
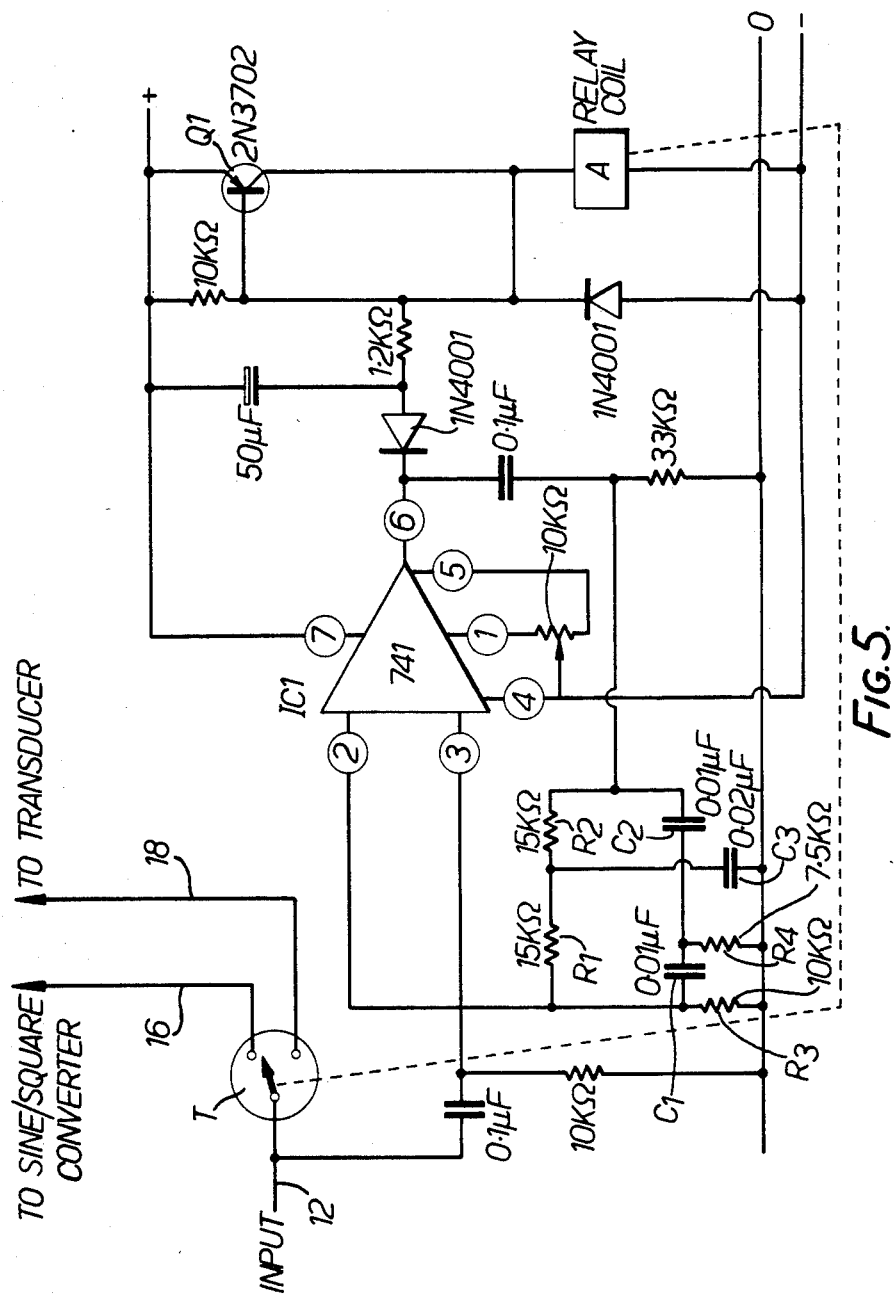

The speech detector and switch maybe of any suitable arrangement which will differentiate between the relatively low frequencies of the tone signals and the higher frequencies found in communications bandwidth speech. An example of such a circuit is shown in FIG. 5. In this circuit the incoming frequencies at terminal 120 are routed to an operational amplifier IC1 whose output drives the switching transistor Q1 and hence activates relay coil 'A'. The device IC1 is arranged with a frequency selective filter in its feed back path which comprises the resistors $R_1 R_2 R_3 R_4$ and the capacitors $C_1 C_2$ and $C_3$. The values of these components are chosen to set the frequency at which the relay coil 'A' is activated at a higher frequency than the signalling tones whilst still being within the communications speech band. The values shown as an example in FIG. 5 will cause the relay coil 'A' to be energised only when a frequency component of 1 Khz is present or the input of the circuit. Operation of the frequency detector and switch is as follows: a tone signalling frequency appearing at terminal 120 is passed to IC1 which because of the frequency selective network $R_1 R_2 R_3 R_4 C_1 C_2 C_3$ in its gain controlling feed back path has zero gain at tone signalling frequencies: Q1 and hence relay coil A are not activated and the relay contacts 'T' remain as shown in FIG. 5 passing the tone signals to the sine/square converter via terminal 160 Conversely, a speech signal which contains some frequency content for which the frequency selective network $R_1 R_2 R_3 R_4 C_1 C_2 C_3$ is designed will be amplified by IC1 which now has gain, Q1 will switch, relay coil 'A' will receive current and the contacts 'T' will switch to terminal 180, by-passing the sine/square converter thus permitting normal undistorted speech output.

What we claim is:

1. A telephone subscriber subset for use in a subscriber's handset, said subset being connected to receive signalling and speech signals from a telephone exchange including a transducer for generating audible signalling tones in response to an input thereto, and a detector circuit having input terminals for connecting with the subscriber's handset to distinguish between signalling and speech signals, the subscriber's handset including conversion means having an input for converting the input signals to substantially non-sinusoidal electrical waveforms, wherein speech signals and signalling signals are received at the input terminals of said detector circuit, said detector circuit including switch means having a first output connected to said transducer for providing said speech signals directly to the transducer so as to allow the transducer to be used as an earpiece, and having a second output connected to the input of said conversion means for providing said signalling signals as input signals to said conversion means for conversion to substantially non-sinusoidal electrical waveforms, said substantially non-sinusoidal waveforms being fed to the transducer to produce a low-frequency tone output signal.

2. A telephone subscriber subset as claimed in claim 1 wherein said non-sinusoidal waveform is a square wave.

3. A telephone subscriber subset as claimed in any one of claims 1 or 2 wherein the transducer is a piezoelectric transducer.

* * * * *